Figure 1:
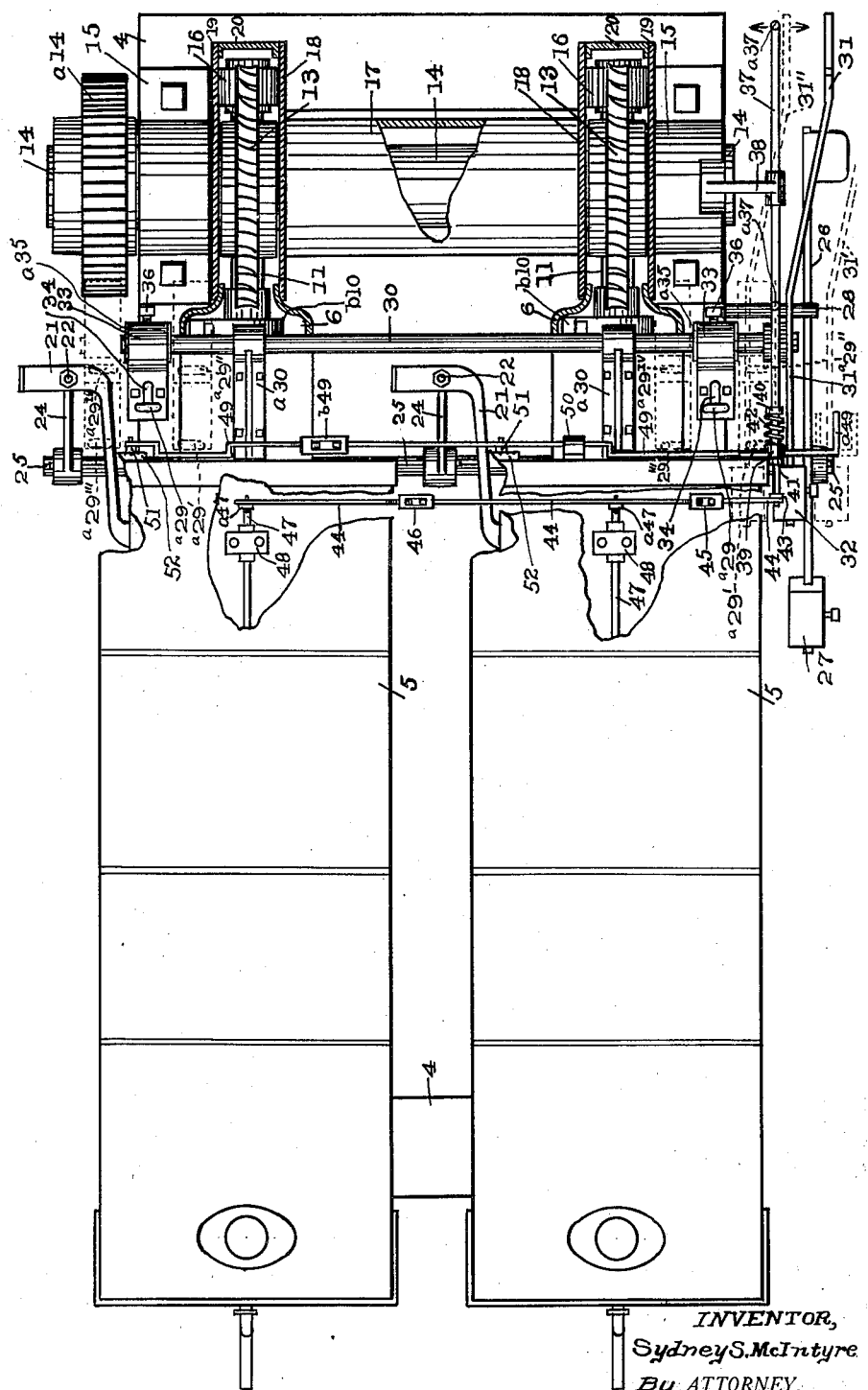

May 29, 1928.  
S. S. McINTYRE  
1,671,479  
BATTERY OF GASOLINE ENGINES WITH MASTER CONTROLS  
Filed Jan. 5, 1925  2 Sheets-Sheet 1

INVENTOR,  
Sydney S. McIntyre  
By ATTORNEY.  
David E. Lain,

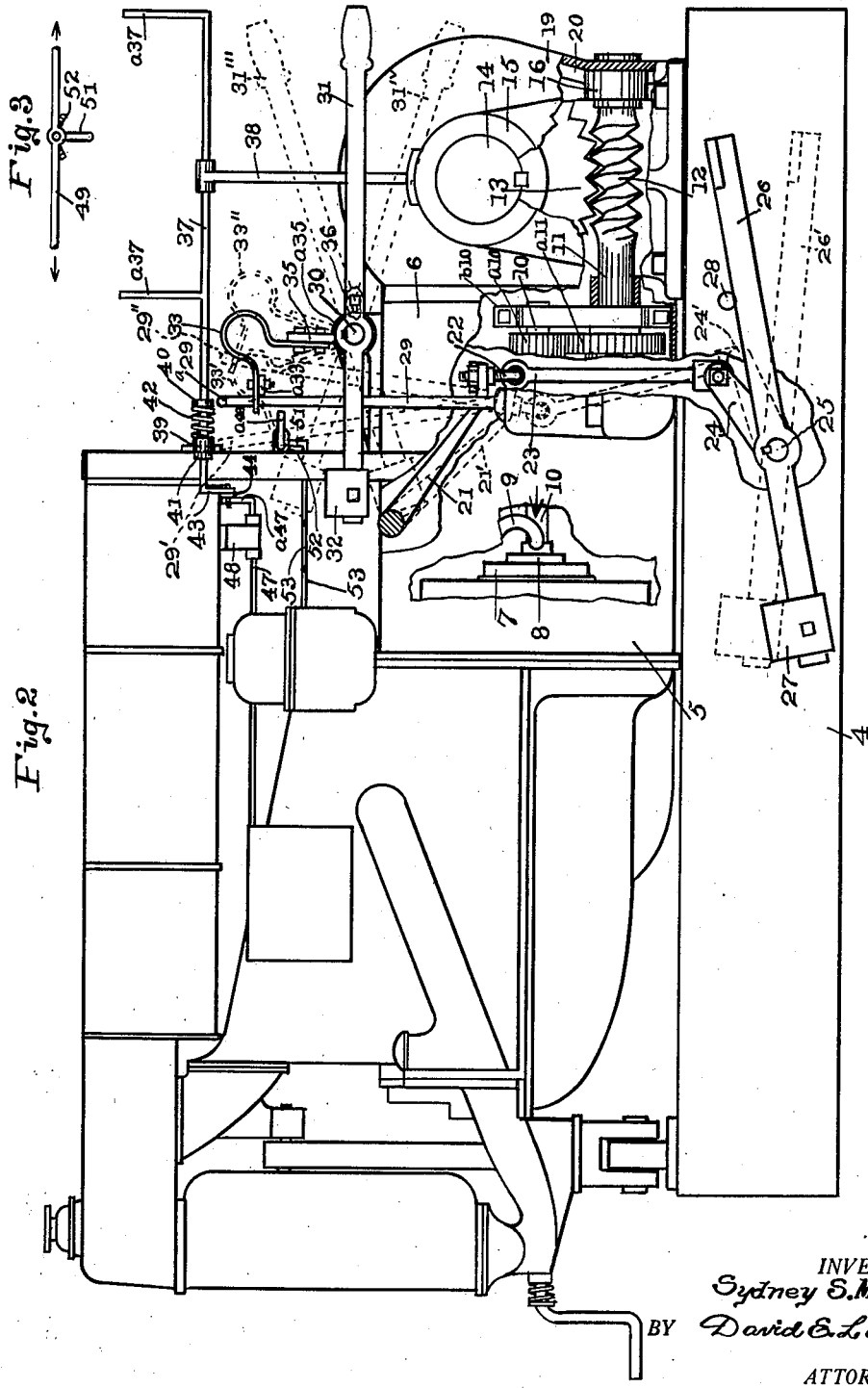

Patented May 29, 1928.

1,671,479

UNITED STATES PATENT OFFICE.

SYDNEY S. McINTYRE, OF SEDRO-WOOLLEY, WASHINGTON.

BATTERY OF GASOLINE ENGINES WITH MASTER CONTROLS.

Application filed January 5, 1925. Serial No. 651.

My invention relates to improvements in batteries of gasoline engines with master controls, and one of the objects of my improvements is to provide suitable power connections between a plurality of gasoline engines and a single power shaft operated thereby. Another object of my improvements is to provide single control devices to simultaneously operate all of the similar controls of a battery of gasoline engines. Another object of my improvements is to provide for the operation of the group of master controls from one place. And a further object of my improvements is to provide a small-cost power plant by uniting in a single shaft the power of a plurality of automotive gasoline engines each having in place a full equipment of power, speed, fuel and synchronizing controlling devices all operable by my master controls.

I attain these objects with the mechanism illustrated in the two sheets of drawings accompanying this specification, and forming a part thereof, in which Figure 1 is a plan view of two gasoline tractor engines connected to one power shaft, Fig. 2 is a side elevation of Fig. 1, and Fig. 3 is a segregated front elevation of one of the spark controls with my master operating rod attached.

Similar characters refer to similar parts throughout. Certain parts are broken away to show other parts hidden thereby.

Automotive gasoline engines have been developed for power, lightness and efficiency to a high degree of perfection; and, because of quantity production, a fully equipped power plant of small power can be had for a small cost. These engines have special control devices which hitherto have been thought to require separate operative attention. Because of this it is not customary to assemble these engines under a single set of controls to drive a single shaft. But I have done this in a simple and effective manner the details of which will now be fully described as referring to a battery of two gasoline tractor engines of a well-known make.

On bed frame 4 are mounted two gasoline tractor engines 5, 5 from which the road wheels have been removed. The gear cases are shown at 6, 6, and a part of the friction clutch of one tractor is shown at 7 and 8 in Fig. 2. The lower end only of clutch lever 9 of one engine is shown in Fig. 2, and the front end of transmission drive shaft 10 where connected to said friction clutch and the rear end of the same are shown at $b^{10}$ in Fig. 2. One of the transmission gears $a^{10}$ is shown mounted on said shaft 10. Worm shaft 11 with worm 12 thereon is mounted with the transmission gears and in ball-bearing bracket 16 as usual. Worm 12 engages with worm wheel 13 which is rigidly mounted on shaft 14. The combined worm wheel and differential gears of the usual tractor shaft drive are not needed in this case and are replaced with worm wheel 13 directly mounted as stated. Power shaft 14 is mounted for revolution in bearings 15 on frame 4. As shown, each engine is connected to shaft 14 by its worm 12 and worm wheel 13; the latter are located on shaft 14 in the proper places to connect with said tractor worms. As illustrated, drive gear $a^{14}$ is rigidly mounted on one end of shaft 14 for engagement with the machinery to be driven, not shown. Between worm wheels 13 shaft 14 is housed by casing 17 which has a flange 18 on each end thereof to form a part of the casings for said worm drives. Proximate to bearing brackets 15, 15 are plates 19, 19 of the same shape as flanges 18, 18. Said plates and flanges are fastened to the rear ends of gear casings 6, 6, and the remainder of their peripheries are closed by bands 20, 20 fastened thereto to complete the casings around said worm and worm wheels.

Each of clutch pedals 21, 21 has an adjustable eyebolt 22 engaged therewith to depend therefrom. With each of said eyebolts is engaged one of links 23, each of which in turn is engaged with one of cranks 24. Cranks 24 are both mounted rigidly on rocker shaft 25. Shaft 25 is mounted for oscillation in bearings in frame 4, not shown, and one end thereof protrudes beyond said frame and has rigidly mounted thereon master clutch pedal 26. Said master pedal is counterbalanced by adjustable weight 27 which is set to cause said pedal to normally bear against stop 28 fastened to frame 4. Foot pressure applied to master pedal 26 carries it toward its dotted-line position at 26' and also carries both of clutch pedals 21, 21 downward toward their dotted-line positions at 21', 21', Fig. 2. As is well known, depressing clutch pedals 21 forces clutch levers 9, one only of which is shown in Fig. 2, with leverage advantage against the friction clutches, one of which is partly shown in Fig. 2 at 7, 8, in the direction indicated by the arrow and forces back the spring, in each clutch, not shown, which normally reacts to force the driven plates of said clutch into frictional engagement with the driver plates thereof and transmit the power of rotation of the engine shaft to the transmission gears. In this manner the clutches of both engines are simultaneously controlled by master clutch pedal 26.

The gear-shift levers 29, 29 of engines 5, 5 are shown in full lines in their central neutral positions. The upper end of each of these levers is a round rod with a flat head $a^{29}$ and their lower ends are mounted in universal joints in bearings on said engines. Rocker shaft 30 is mounted for oscillation in bearings $a^{30}$, $a^{30}$ fastened on gear cases 6, 6. The front end of shaft 30 extends beyond the front side of frame 4 and has rigidly mounted thereon master gear-shift lever 31. Said lever is counterbalanced by adjustable weight 32. Arms 35, 35 on hubs $a^{35}$, $a^{35}$ are mounted on shaft 30 and set in any desired position thereon by set screws 36, 36. To each of arms 35 is fastened one of U-shape springs 33, 33, projecting upward and extending forward. In the front end of each of springs 33 is a T slot 34 in which is engaged one of gear shift levers 29 by presenting said slot parallel with flat head $a^{29}$ and passing spring 33 down over the same to engage with the round handle thereof before said spring is fastened to arm 35, and said lever loosely is retained against the forward end of said slot by clamp plate $a^{33}$ fastened to said spring. By moving the master gear-shift lever to its dotted-line position at 31', Fig. 1, said gear shift levers 29 are simultaneously moved longitudinally in springs 33 to their left neutral positions. By moving master lever 31 to its position at 31''', in Fig. 2, gear shift levers 29, 29 are both carried to the positions shown at 29', 29' in Fig. 1, which, as is well known, engages the low speed transmission gears of both engines 5, 5. Then by moving master lever 31 to its position at $31^{IV}$, Fig. 2, gear shift levers 29, 29 are both carried to their positions at 29'', 29'' in Fig. 1; in which position of said gear shift levers the transmission gears of both engines are set for intermediate speed. Then by moving master lever 31 to its neutral position at 31, in Fig. 2, shift levers 29, 29 are carried to their left neutral positions. Now by moving master lever 31 to its position shown at 31'', in Fig. 1, said shift levers 29, 29 are carried to their right neutral positions. Then by moving master lever 31 to its position at 31''', in Fig. 2, shift levers 29, 29 are carried to their positions at 29''', 29''' in Fig. 1, when said transmission gears of both engines 5, 5 are engaged for high speed. Also by moving said master lever 31 to its position at $31^{IV}$, from its last-mentioned position, gear shift levers 29, 29 are carried to their positions at $29^{IV}$, $29^{IV}$, shown in Fig. 1, when the transmission gears of both engines are engaged for reverse movement, from which it is clear that gear shift levers 29, 29 are moved simultaneously by master lever 31 to and from their several operative positions as though separately moved by hand as usual. Springs 33, 33 are adjustable relatively both as to proximity and as to angularity by shifting hubs $a^{35}$, $a^{35}$ on shaft 30 and retaining them in the desired situation by set screws 36, 36. These adjustments provide for bringing gear shift levers 29, 29 into proper related positions. The simultaneous engagement of both sets of transmission gears requires the shift gears which they control to synchronize in their reciprocal and rotary movements and both present themselves for engagement at the same moment. But it is bound to usually happen that said shift gears do not find simultaneous engagement possible. Here the need of spring plates 33 appears in that they are stiff enough to hold the shift gears hard against their driving gears and yet they are resilient enough to yield under pressure from master lever 31 and thus the gear first to find engagement possible springs into engagement to be followed by the other gear in the very short time required for its opportunity to engage to occur. In practice the described construction places the desired control in master lever 31. Springs 33 serve a double purpose in that they are a structural part of arms 35, 35 and they also provide a resilient member to intervene as such in the driving connection between shaft 30 and levers 29, 29 when said shaft is oscillated but they provide no resilience when said shaft is reciprocated.

Master throttle shaft 37 is mounted for oscillation in bearing brackets 38 fastened to bearing 15 and 39 fastened to one of the gasoline tanks. Spring 42 mounted on said shaft reacts between boss 40 thereon and said bearing 39 to place the oscillation of said shaft under frictional resistance between bearing 39 and boss 41 on said shaft. Handles $a^{37}$, $a^{37}$ are fastened to shaft 37 and project above the same to provide hand holds for oscillating the shaft. Rigidly fastened to the front end of shaft 37 is crank 43 engaged with connecting rod 44. Connecting rod 44 engages with two cranks $a^{47}$, $a^{47}$, of equal length, one of which is rigidly fastened on the rear end of each of throttle-control rods 47, 47. The rear ends of said throttle rods are mounted in bearings 48, 48 fastened beneath the tanks of the engines. Turnbuckles 45 and 46 are connected in connecting rod 44 to provide relative adjustment for cranks $a^{47}$, $a^{47}$. Shaft 37 is oscillated by vibrating either of handles $a^{37}$ and causes simultaneous oscillations of throttle rods 47, 47 which control the gasoline throttle valves of engines 5, 5. Thus both of said throttle valves, not shown, are simultaneously and equally moved by either of master handles $a^{37}$, and the gasoline supply of both engines is thus simultaneously controlled by said master handles.

Master spark-control rod 49 is mounted for reciprocation in bearing 50 on one of the gasoline tanks and is engaged with cranks 51, 51 of equal length and fastened on the rear ends of spark-control rods 53, 53. The upper ends of cranks 51 are sharpened to engage with segmental racks 52, 52, see Fig. 3, and localize the positions in oscillation of said cranks. The front end of rod 49 is bent to form handle $a^{49}$; the master spark-control handle, the movement of which to and from its illustrated positions causes simultaneous and equal oscillation of rods 53, 53 which control the spark timers. In rod 49 between cranks 51, 51 is turnbuckle $b^{49}$ the turning of which adjusts the relative position of said cranks.

Master timer handle $a^{49}$, master throttle handles $a^{37}$, master gear-shift lever 31 and master friction clutch pedal 26 are all preferably located within easy reach of one operator and are all operable by him to control the spark, gasoline supply, power transmission and transmission gears of both engines simultaneously to cause them to fully cooperate in delivering their power to revolve drive shaft 14 at either of three speeds forward and one speed in reverse direction.

In practice I have connected two Fordson tractor engines to the power shaft of a logging donkey after the manner described above. In this case, since the reverse can not be employed, I removed the reverse idler gear from each of the sets of transmission gears and increased the driven gear connected therewith in diameter to connect with the driver gear and thus have obtained a fourth speed ahead at small additional expense. Few logging donkeys are equipped with gears to provide for more than two speeds; although in sky-line logging over rough and hilly ground a four speed donkey is found to possess very important advantages in that equal work can be done with less power.

Having thus disclosed my invention, what I claim as new and desire to secure by Letters Patent is,—

A multiple-unit power plant consisting of a plurality of gasoline engines each having an engine shaft with a driving connection through speed-changing transmission gears with a main power shaft, a plurality of gear-shift levers in line each mounted on a universal joint in a bearing on one of said engines, a gear-control shaft mounted for oscillation and reciprocation in bearings on said engines parallel with said line of said gear-shift levers, a hand lever fastened to one end of said gear-control shaft, a plurality of arms adjustably fastened to said gear-control shaft in approximate parallelism with the plane of said gear-shift levers, a plurality of U-shape resilient members one end of each of which is fastened to the upper end of one of said arms each having its other end engaged with the upper end of one of said gear-shift levers whereby either oscillation or reciprocation of said gear-control shaft will cause oscillation of said gear-shift levers simultaneously and of like angle.

SYDNEY S. McINTYRE.